United States Patent
Wolfe et al.

(10) Patent No.: US 8,244,982 B2
(45) Date of Patent: Aug. 14, 2012

(54) ALLOCATING PROCESSOR CORES WITH CACHE MEMORY ASSOCIATIVITY

(75) Inventors: Andrew Wolfe, Los Gatos, CA (US); Thomas Martin Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 348 days.

(21) Appl. No.: 12/545,625

(22) Filed: Aug. 21, 2009

(65) Prior Publication Data

US 2011/0047333 A1    Feb. 24, 2011

(51) Int. Cl.
*G06F 13/00* (2006.01)
*G06F 13/28* (2006.01)
(52) U.S. Cl. ............... 711/128; 711/153; 711/E12.023; 711/E12.038
(58) Field of Classification Search ............... None
See application file for complete search history.

(56) References Cited

U.S. PATENT DOCUMENTS

| 5,689,653 | A | * | 11/1997 | Karp et al. ............. 712/222 |
| 5,860,151 | A | * | 1/1999 | Austin et al. ........... 711/213 |
| 2004/0260883 | A1 | * | 12/2004 | Wallin et al. ............ 711/137 |
| 2008/0040554 | A1 | * | 2/2008 | Zhao et al. .............. 711/133 |
| 2008/0209133 | A1 | * | 8/2008 | Ozer et al. .............. 711/146 |
| 2009/0106495 | A1 | * | 4/2009 | Chou ..................... 711/130 |
| 2010/0268891 | A1 | | 10/2010 | Conte et al. |

OTHER PUBLICATIONS

"International Search Report and Written Opinion" dated Mar. 30, 2011 regarding Application No. PCT/US2010/038403.

* cited by examiner

*Primary Examiner* — Kevin Verbrugge
*Assistant Examiner* — Eric S Cardwell
(74) *Attorney, Agent, or Firm* — Dorsey & Whitney LLP (57) ABSTRACT

Techniques are generally described related to a multi-core processor with a plurality of processor cores and a cache memory shared by at least some of the processor cores. The multi-core processor can be configured for separately allocating a respective level of cache memory associativity to each of the processing cores.

20 Claims, 6 Drawing Sheets

| 800 | A computer program product. |
|---|---|

| 802 | A computer readable medium. |
|---|---|

| 804 | at least one of |
|---|---|
| 806 | one or more executable instructions to determine the degree to which a processing tread contains strided references; |
| 808 | one or more executable instructions 808 to configure the multi-core processor to mark a thread as cacheable or non-cacheable; |
| 810 | one or more executable instructions to configure the multi-core processor to store instructions in thread not marked as non-cacheable or marked as cacheable. |

Figure 10

ALLOCATING PROCESSOR CORES WITH CACHE MEMORY ASSOCIATIVITY

BACKGROUND

Multi-core processors have emerged as a mainstream computing platform in major market segments, including personal computer (PC), server, and embedded domains. As the number of processor cores on a given chip increase, so too does the potential demand on that chip's local memory. When the processor executes an instruction, for example, the processor first looks at its on-chip cache to find the data associated with that instruction to avoid performing a more time-consuming search for the data elsewhere (e.g., off-chip or on a main memory chip). Multiple processor cores may share a single cache, either a primary cache or a cache elsewhere within a cache hierarchy such as an L2 or L3 cache. With multiple cores, multiple incoming application streams may interfere with each other while seeking shared cache space, and as a result, may cause a shared cache, and, thus, the processor to operate inefficiently. Other factors relating to multiple cores may also reduce efficiency.

Not all applications, however, benefit substantially from the availability of additional cache resources. One example is a streaming application, where data is fetched into the cache, processed, and then is unlikely to be reused. Thus, different types of applications sharing cache space with equal priority may result in sub-optimal allocation of cache resources. Conflict among processor cores for the use of a shared cache may be expensive in terms of both latency and power as a result of additional requests to off-chip memory.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings.

In the drawings.

DETAILED DESCRIPTION

The following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, apparatus, systems and computer program products related to separately allocating a memory space within a cache to individual processor cores accessing the cache. In a multi-core processor system, several applications may be running in parallel on separate processor cores, each processor core with its own memory requirements. Memory space, however, is finite. Depending on the design of the chip, individual processor cores may have to share local memory space with one or more other processor cores. This local memory may include, for example, the level 2 (L2) or level 3 (L3) caches.

The requirements of some cores of a multi-core processor may differ from the requirement of other cores of the processor, and these requirements may also change over time. One such requirement may be the amount and/or characteristic of cache memory needed to achieve adequate processing performance. For example, one core may operate adequately when it has access to a cache memory that is direct mapped so that data stored in main memory at an address may be stored at only one location in the cache memory. A cache memory of this type may provide a lower latency where that characteristic at the expense of a lower cache hit rate, which may not be as critical to the optimum performance of the core. One the other hand, another core, for example, may be able to perform well with a high latency, but may require a relatively high cache hit rate. A core having this requirement may operate more efficiently with a level of associativity that is higher than is provided by a direct mapped cache memory. For example, data stored at an address in main memory may be stored at one of several different locations in the cache memory, such as 4 locations. Such cache memories are referred to as N-way set associative, where N is the number of locations where the data can be stored in the cache memory. Just as the associativity of cache memory may be allocated by core, the decision whether to cache instructions or data stored in main memory may vary by the characteristics of various processing threads. For example, some threads may contain a large number of instruction loops, which may require that the same instructions be repeatedly accessed. These threads may greatly benefit by having their instructions stored in cache. Other threads my be predominantly composed of instructions having a low locality and as a result will not significantly benefit by caching the instructions. Other threads may be composed of instructions that will be executed in a predictable manner, such as a thread having very few branches. Caching the instructions in such threads may also provide limited benefits because the predictability of the execution of these instructions makes it easy to prefetch them so they will be available for execution by the processor.

As is described herein, various examples for efficient use of shared cache resources in a multi-core computing environment are disclosed. By recognizing which processor cores may benefit from accessing cache memory having different characteristics, the manner in which different processor cores can access caches memory may be different for different cores of a multi-core processor. For example, a cache memory may be 4-way set associative for one processor core, 2-way set associative for another processor core, and direct mapped for still another processor core. Furthermore, as application execution characteristics or other characteristics of a processor core change over time, cache associativity may change dynamically, thus dynamically optimizing overall system performance. In other examples, a thread may be flagged as non-cacheable if it contains instructions that can be expected to be executed in a predictable manner or it contains a substantial number of non-looped instructions, which are referred to as strided references. Because strided references are non-looped, threads conating strided references may not benefit from being stored in cache memory. Other threads may contain a relatively large number of non-strided instructions, and these threads may be stored in cache memory.

Figure 1:
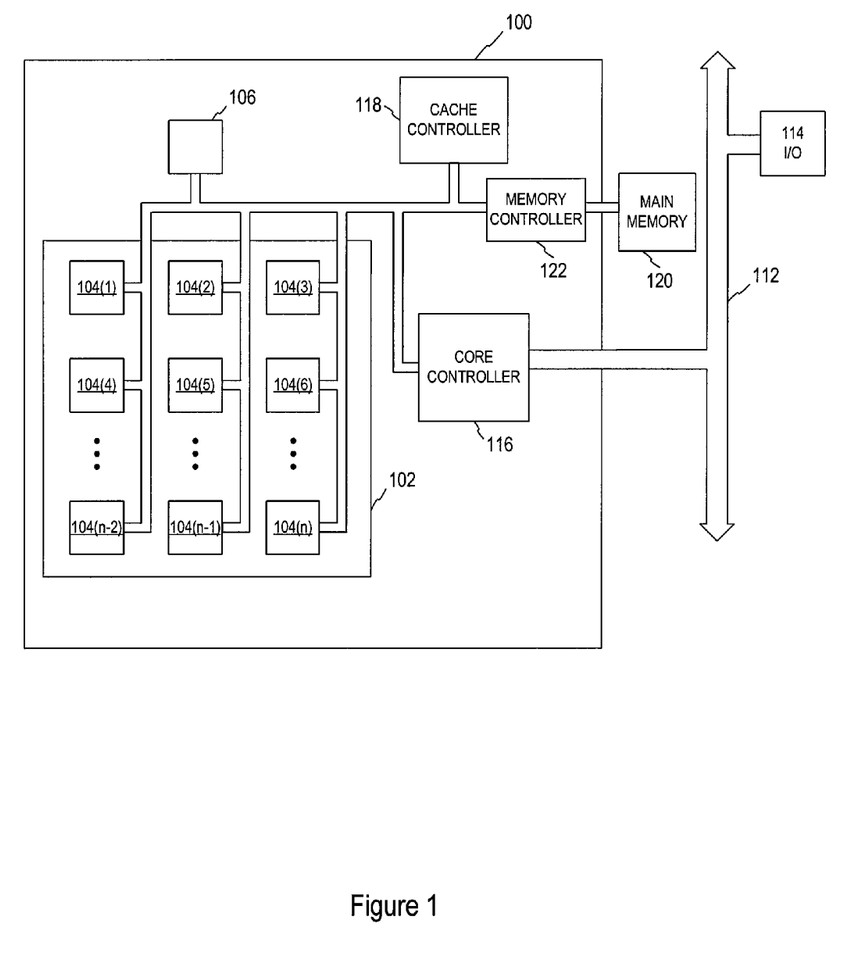
FIG. 1 is a schematic diagram illustrating a multi-core processor.

FIG. 1 is a schematic diagram illustrating a multi-core processor 100 according to at least some examples of the present disclosure. The multi-core processor 100 may include a single integrated circuit having a processor core array 102. The processor core array 102 may include some number (N) of processor cores 104(1)-104(N). Any suitable number of processor cores 104 may be provided. Each processor core 104 may generally be of any desired configuration including but not limited to a microprocessor (µP), a microcontroller (µC), a digital signal processor (DSP), or any combination thereof. Thus, each processor core 104 may include logic for executing program instructions as well as other functional blocks such as an arithmetic logic unit (ALU), a floating point unit (FPU), a digital signal processing (DSP) core, registers, accumulators, etc. All or just some of the cores 104 may include a cache memory (not shown).

The multi-core processor 100 may include a cache memory 106 in addition to any cache memory in any of the cores 104. The cache memory 106 may be implemented with any type of memory device, which may be volatile or non-volatile. The cache memory 106 may be implemented with, for example, a dynamic random access memory ("DRAM") device, a static random access memory ("SRAM") device, or a flash memory device, to name a few examples. The cache memory 106 may be at any level with respect to the cores 104, such as a level one cache, and additional levels may or may not be included in some examples. The cache memory 106 may be shared by some or all of the cores 104. The multi-core processor 100 may include a cache controller 118 that may be adapted to control the manner in which the cores 104 may access the cache memory 106, as described in greater detail below.

The multi-core processor 100 may be coupled to a main memory device 120, either directly or though an interface device, such as a memory controller 122. The main memory device 120 may be any suitable form of memory including, but not limited to, volatile memory such as a DRAM device or an SRAM device), a non-volatile memory such as read only memory (ROM) device or a flash memory device, data storage devices such as magnetic disk storage (e.g., hard disk drive or HDD), tape storage, optical storage (e.g., compact disk or CD, digital versatile disk or DVD), or other machine-readable storage mediums that may be removable, non-removable, volatile or non-volatile. The bus 112 may also support an interface between the multi-core processor 100 and another component, such as an input-output (I/O) device 114, external sensor, or the like, or may be a resource shared by any subset of the processor cores 104.

As stated above, the multi-core processor 100 may have any suitable number of processor cores 104. For example, multi-core processor 100 may have two (2) cores, four (4) cores, tens of cores, and even hundreds or more of processor cores. Some multi-core processors may be homogenous, such that each of the processor cores use a single core design. Other multi-core processors may be heterogeneous, such that one or more of the processor cores may be different from one or more of other processor cores, and each core or subset of cores may be designed for a different role in the multi-core processor 100.

The multi-core processor 100 may include a core controller 116. the core controller 116 may be configured to determine which processing tasks, known as "threads," are to be processed by individual processor cores 104 as well as which threads are to be stored or not stored in the cache memory 106. This determination may be made on the basis of indicia, such as flags, inserted in the code executed by the processor cores 104. The indicia may be inserted in the executable code during compilation from source code, or it may be inserted by an operating system running on the processor cores 104 or by some other means.

FIG. 1 is an illustrative schematic of a multi-core processor and does not illustrate physical location of the components illustrated therein. It is appreciated that the multi-core processor 100 described herein is illustrative and that examples and modifications are possible. Design choices may be driven by, for example, considerations of hardware size and complexity versus performance, thermal energy and heat dissipation, processor speed, overall throughput, etc.

As may be appreciated by one skilled in the art, the multi-core processor 100 may be provided in a suitable computing environment, such as a personal computer (PC). A computing environment may include the multi-core processor 100, main memory 120, one or more buses, and one or more I/O devices, such as a keyboard, mouse, touch screen, display device, such as a CRT or LCD based monitor, universal serial bus (USB) or other port connections, CD drives, DVD drives, and the like. Bus connections among the various components may be implemented using bus protocols such as Peripheral Component Interconnect (PCI), PCI Express, Accelerated Graphics Port (AGP), HyperTransport, or any other suitable bus protocol, and connections between different devices may use different protocols. A PC may operate in a networked environment using logical connections to one or more remote computers. Such remote computers may be, for example, other PCs, servers, routers, network PCs, peer devices, or other common network nodes, and may include many or all of the elements described above relative to multi-core processor 100. Logical connections may comprise, for example, a local-area network (LAN) or a wide-area network (WAN), intranets and the Internet.

Figure 2:
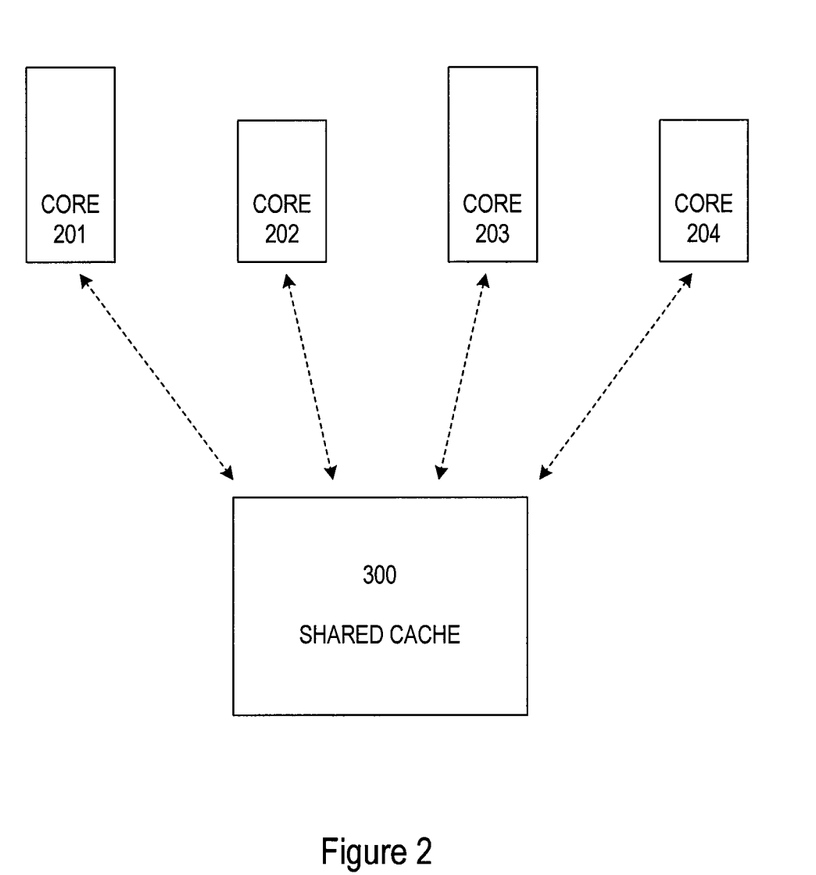
FIG. 2 is a schematic diagram illustrating a shared cache memory.

FIG. 2 is a schematic diagram illustrating a shared cache memory according to at least some examples of the present disclosure. FIG. 2 illustrates a plurality of processor cores 201-204, suitable for use in a multi-core processor system. Each of processor cores 201-204 may have differing performance characteristics, as represented by the varying sizes of cores 201-204. For example, the larger cores 201 and 203 may be of higher performance, suitable for more complex software applications, as compared to the smaller cores 202 and 204, which may be suitable for processing software applications of less complexity. It is to be appreciated that more or fewer cores may be provided, that the cores may be of uniform or varying size, and that specific descriptions of the cores herein are not intended to be limiting.

Figure 3:
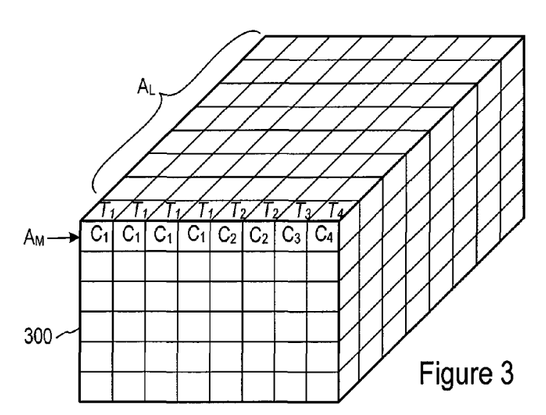
FIG. 3 is a schematic diagram illustrating an example of a cache memory with levels of associativity individually allocated by processor core.

FIG. 3 is a schematic diagram illustrating a shared cache memory 300 according to at least some examples of the present disclosure. As shown in FIG. 3, the cache memory 300 may have different levels of associativity individually allocated among a plurality of processor cores 201-204. Each of cores 201-204 may be arranged to transfer data to and from shared cache memory 300. The cache controller 118 (FIG. 1), either alone or in combination with the core controller 116, may be adapted to control the manner in which each of the cores 201-204 may access the cache memory 300. The cache memory 300 may use any suitable replacement policy for evicting cache entries with new entries, such as a least recently used ("LRU") replacement policy. The processor cores 201-204 may be configured to write instructions and data to the cache memory 300 using any suitable write policy, such as by the cache memory 300 being a write-through cache memory, in which the processor cores 201-204 write to the main memory 120 every time they write to the cache memory 300, or a write-back cache memory, in which the processor cores 201-204 do not immediately write instructions or data to the main memory 120 when they write instructions or data to the cache memory 300. Other write policies may also be used.

Figure 4:
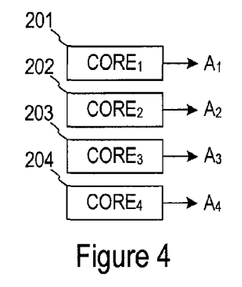
FIG. 4 is a block diagram illustrating an example of a plurality of processor cores each of which may output an address.

FIG. 4 is a block diagram illustrating a plurality of processor cores 201-204 each of which may output an address according to at least some examples of the present disclosure. More specifically, as shown in FIG. 4, each processor core 201-204 may output a respective address $A_{1-4}$, either directly or through a memory controller (not shown). The address $A_{1-4}$ may be used to read data stored in the main memory 120 (FIG. 1) and possibly in the cache memory 300.

Figure 5:
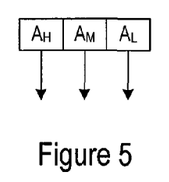
FIG. 5 is a schematic diagram illustrating an example of the composition of addresses output by a plurality of processor cores.

FIG. 5 is a schematic diagram illustrating the composition of addresses $A_{1-4}$ output by a plurality of processor cores 201-204 arranged according to at least some examples of the present disclosure. As shown in FIG. 5, the address $A_{1-4}$ may be composed of a plurality of address bits, which may be divided into low order address bits $A_L$, middle order address bits $A_M$, and high order address bits $A_H$. The choice of which bits to place in each of the groups may vary and may depend on a number of design parameters. The middle order address bits $A_M$ may be used as an index to select a respective row of memory cells in the cache memory 300. Different indexes or ranges of indices will therefore select different rows of memory cells in the cache memory 300. As shown in FIG. 3, the cache memory 300 may conceptionally be considered a three dimensional array in which each row of memory cells is divided into a plurality of columns, and each column has a "depth" of memory locations that can be addressed either individually or as a group. In reality, each column of a row shown in FIG. 3 may be every $N^{th}$ column, with N intervening columns serving as the "depth" of memory locations shown in FIG. 3.

The cache controller 118, either alone or in combination with the core controller 116, may be adapted to designate certain of the columns in each row of the cache memory 300 to be accessed by a specific one of the processor cores 201-204, as designated by $C_1$-$C_4$, respectively. For example, the first 4 columns of the first row shown in FIG. 3 may be accessed only by the core 201, the next 2 columns of the first row may be accessed only by the core 202, and each of the next 2 columns may be accessed only by the core 203 and the core 204, respectively. As further shown in FIG. 3, the first location in each of the columns stores a tag $T_{1-4}$ for use by a specific one of the cores 201-204. The tags $T_{1-4}$ may be composed of the high order bits $A_H$ of a memory address. Thus, for example, the first 4 columns of the first row may store four tags $T_1$ corresponding to data that may be accessed by the processor core 201. The next 2 columns of the first row may store two tags $T_2$ corresponding to data that may be accessed by the processor core 202. Finally, each of the next 2 columns of the first row may store a single tag $T_3$ and $T_4$, respectively, corresponding to data that may be accessed by the processor cores 203 and 204, respectively. The data corresponding to each of the tags $T_{1-4}$ may be stored in the memory locations in each column, and this data may be accessed by the low order address bits $A_L$.

Figure 6:
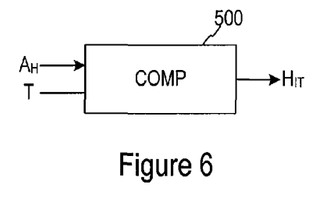
FIG. 6 is a block diagram of a comparator configured to compare a tag stored in the cache memory to a portion of an address from a processor core.

FIG. 6 is a block diagram of a comparator 500 configured to compare a tag stored in the cache memory 300 to a portion of an address from one of the processor cores 201-204, according to at least some examples of the present disclosure. In operation, for example, the processor core 201 may issue an address $A_1$ to read data from the main memory 120. The middle bits AM of the address $A_1$ are used as an index to access the tags stored in the corresponding row of memory cells in the cache memory 300. As shown in FIG. 5, the tags $T_1$ in the first four columns of the row are sequentially applied to the comparator 500, which may be part of the cache controller 118 (FIG. 1), part of some other component, or a stand-alone device. The comparator 500 may then compare each of the tags $T_1$ to the high order address bits $A_H$ of the address $A_1$. In the event of a match, the comparator 500 outputs a "hit" indication, which indicates that the data corresponding to the address $A_1$ is stored in the cache memory 300 as well as in the main memory 120. The hit indication may be used by the cache controller 118 to access the data corresponding to the address $A_1$ by using the low order address bits $A_L$ to access that data stored in the row corresponding to the index $A_M$ and the column in which the tag T is stored.

As explained above and as shown in FIG. 3, the data corresponding to a memory address $A_1$ issued by the processor core 201 may be stored in any one of 4 columns in a row designated by the middle order bits $A_M$ of the address $A_1$. Insofar as the data being read by the processor core 201 may be stored in any one of 4 columns in the cache memory 300 (as designated by the columns $C_1$), the cache memory 300 is considered to be 4-way set associative for the processor core 201. However, in accordance with the principles of the present disclosure, the cache memory 300 may have a different level of associativity for other processor cores 202-204. For example, the data being read by the processor core 202 may be stored in any one of 2 columns (designated by the columns $C_2$) in the cache memory 300 so that the cache memory 300 is considered to be 2-way set associative for the processor core 202. Finally, since the data being read by each of the processor cores 203, 204 may be stored in only one column (designated by $C_3$ and $C_4$, respectively), the cache memory 300 is considered to be direct mapped for the processor cores 203 and 204. The level of associativity of each processor core 201-204 may be based, for example, on the characteristics or capabilities of each of the processor cores or the nature of the software being run by each of the processor cores.

Although the level of associativity of each processor core 201-204 may be fixed, in some examples the level of associativity of each processor core 201-204 may be dynamic so that it may change as conditions change, such as the nature of the software being run by the processor cores. In such case, the cache controller 118 may be reprogrammable to store tags in the cache memory 300 responsive to each write to the main memory 120 corresponding in number to the current level of associativity of the processor core. For example, if the level of associativity of the cache memory 300 for the processor core 202 is increased from 2-way set associative to 3-way set associative, the level of associativity of the cache memory 300 for the processor core 201 may be correspondingly decreased from 4-way set associative to 3-way set associative. In such case, the fourth column designated by $C_1$ in FIG. 3 will be available for access by the processor core 202, and will now be designated by $C_2$.

Although the level of associativity of the cache memory 300 for each processor core 201-204 may be the same for all of the rows of memory cells, in some embodiments the cache controller 118 may set a level of associativity for the cache memory 300 that varies with processor core 201-204 on a row-by-row basis. For example, row N of the cache memory 300 may be 4-way set associative for the processor core 201, and it may be 2-way set associative for the processor core 201 in row N+M of the cache memory 300.

Figure 7:
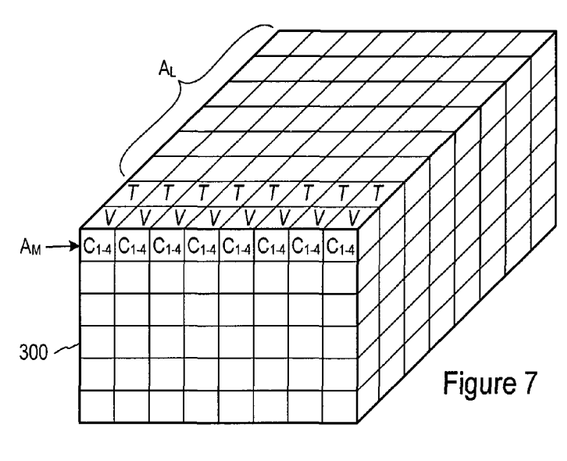
FIG. 7 is a schematic diagram illustrating another example of a cache memory with levels of associativity individually allocated by processor core.

Although each column of the cache memory 300 shown in the example of FIG. 3 may be accessed by only a single one of the individual processor cores 201-204, in other embodiments each column of the cache memory 300 may be accessed by one or more of the individual processor cores 201-204. For example, FIG. 7 is a schematic diagram illustrating a shared cache memory 300 according to at least some other examples of the present disclosure. As shown in FIG. 7, access to the cache memory 300 is controlled by the cache controller 118, either alone or in combination with the core controller 116. The cache controller 118 may be adapted to designate each of the columns in each row of the cache memory 300 to be accessed by any one or more of the processor cores 201-204 $C_{1-4}$ depending on the value of a respective bit vector V, which may be stored in a first location in the respective column. For example, the bit vector V may be a 4-bit vector in which each bit of the vector corresponds to a respective one of the processor cores 201-204. If the bit vector is a "1," then the column may be accessed by the corresponding one of the processor cores 201-204. For example, if the bit vector V for a column is "1010," then that column may be accessed by either the processor core 201 or the processor core 203. In the case of a column having a bit vector V of "1111," the column may be accessed by any one of the four processor cores 201-204.

Regardless of the specific value of the bit vector V for each of the columns, the first location in each of the columns stores a tag T for use by the cores 201-204 that may access that column. The tags T may have the same composition as the tags $T_{1-4}$ stored in the cache memory 300 of FIG. 3, and they may be used in the same manner as the $T_{1-4}$ stored in the cache memory 300 of FIG. 3. Specifically, the tags T may be accessed by the low order address bits $A_L$, and the comparator 500 may then compare each of the tags T to the high order address bits $A_H$ of the address $A_1$. In the event of a match, the comparator 500 outputs a "hit" indication, which may be used by the cache controller 118 to access the data corresponding to the address $A_1$.

In accordance with another aspect of the present disclosure, the cache controller 118 may be configured to determine whether to cache data stored in main memory 120 based on at least in part on application threads of execution (hereinafter referred to as "threads") that are running on processor cores 201-204. For example, one application may operate more efficiently when instructions in the thread or data used by the thread are stored in the cache memory 300, while the efficiency of another application may not significantly benefit by instructions in the thread or data used by the thread being stored in the cache memory 300. For example, the decision to stored instructions or data in the cache memory 300 may be accomplished by reference to the locality of a thread. For example, within an application program, some instructions may be looped (executed more than once), while other instructions may be non-looped (only executed a single time). Such non-looped instructions are referred to as strided references. Because strided references are non-looped, e.g., they do not repeat the same instructions more than once, strided references may not benefit from being stored in the cache memory 300. Other instructions may be executed in a predictable manner, in which case the instructions may be prefetched from the main memory 120, thus reducing the need to store the instruction in the cache memory.

Figure 8:
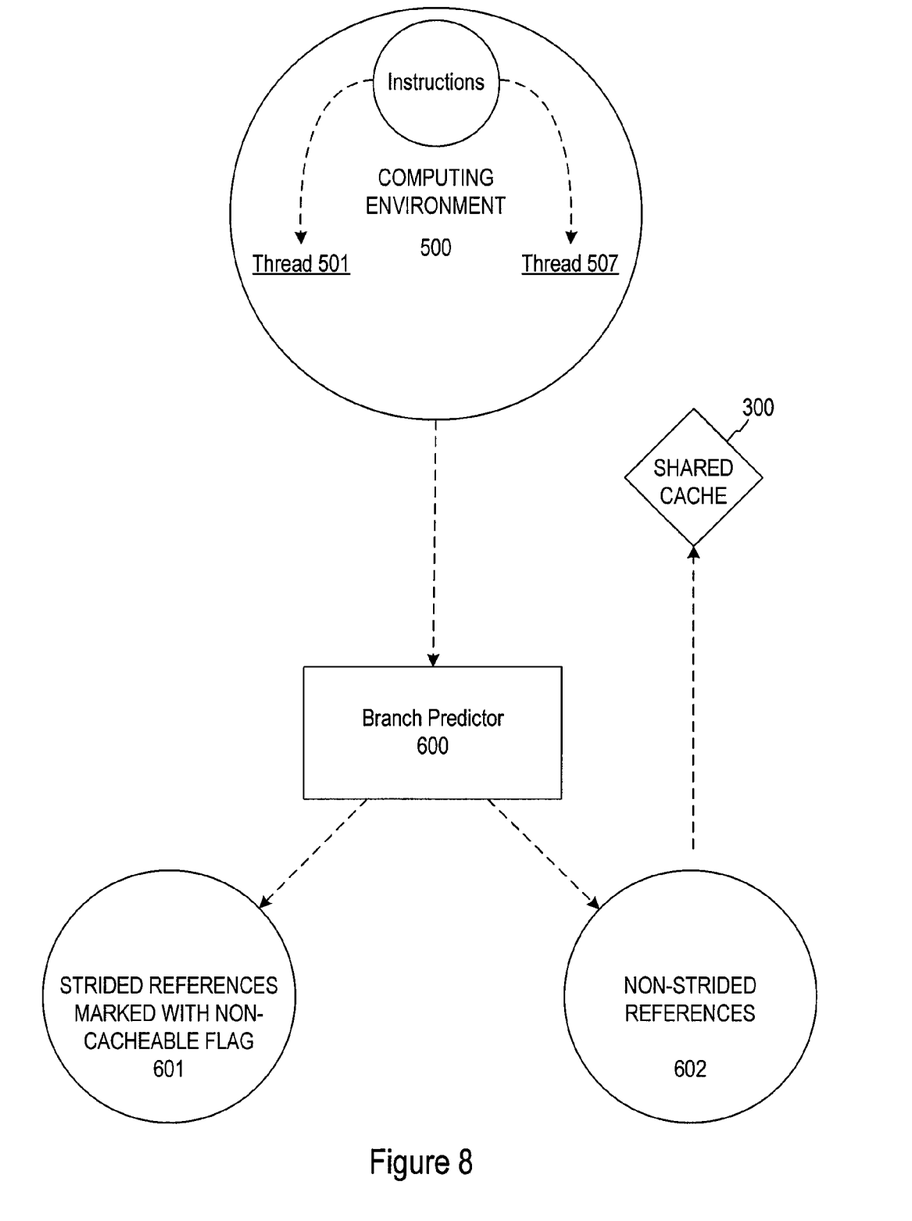
FIG. 8 is a block diagram illustrating a process for cache allocation.

FIG. 8 is a block diagram illustrating a process for cache allocation in accordance with at least some examples of the present disclosure. As depicted in FIG. 8, instructions from a computing environment 500, which may contain a plurality of threads of execution 501-502, may be sent to a branch predictor 600 for a determination of whether the instruction is looped (e.g., whether the branch predictor 600 has seen this instruction more than once), or non-looped. If the branch predictor 600 determines that an instruction is non-looped, thus a strided reference, the instruction may be marked with a non-cacheable flag such that the instruction is never sent to the shared cache memory 300 [block 601]. Alternatively, if the branch predictor 600 determines that an instruction is looped [block 602], the instruction may then be sent to the cache 300 memory. Thus, access to the cache memory 300 may be limited to those instructions which may have greater benefit from the cache space.

It is to be appreciated that software application execution characteristics may change dynamically. Thus, in one or more of the examples disclosed herein, the decision to mark an instruction with a non-cachable flag (block 601) may be configured to change over time in a dynamic manner.

Figure 9:
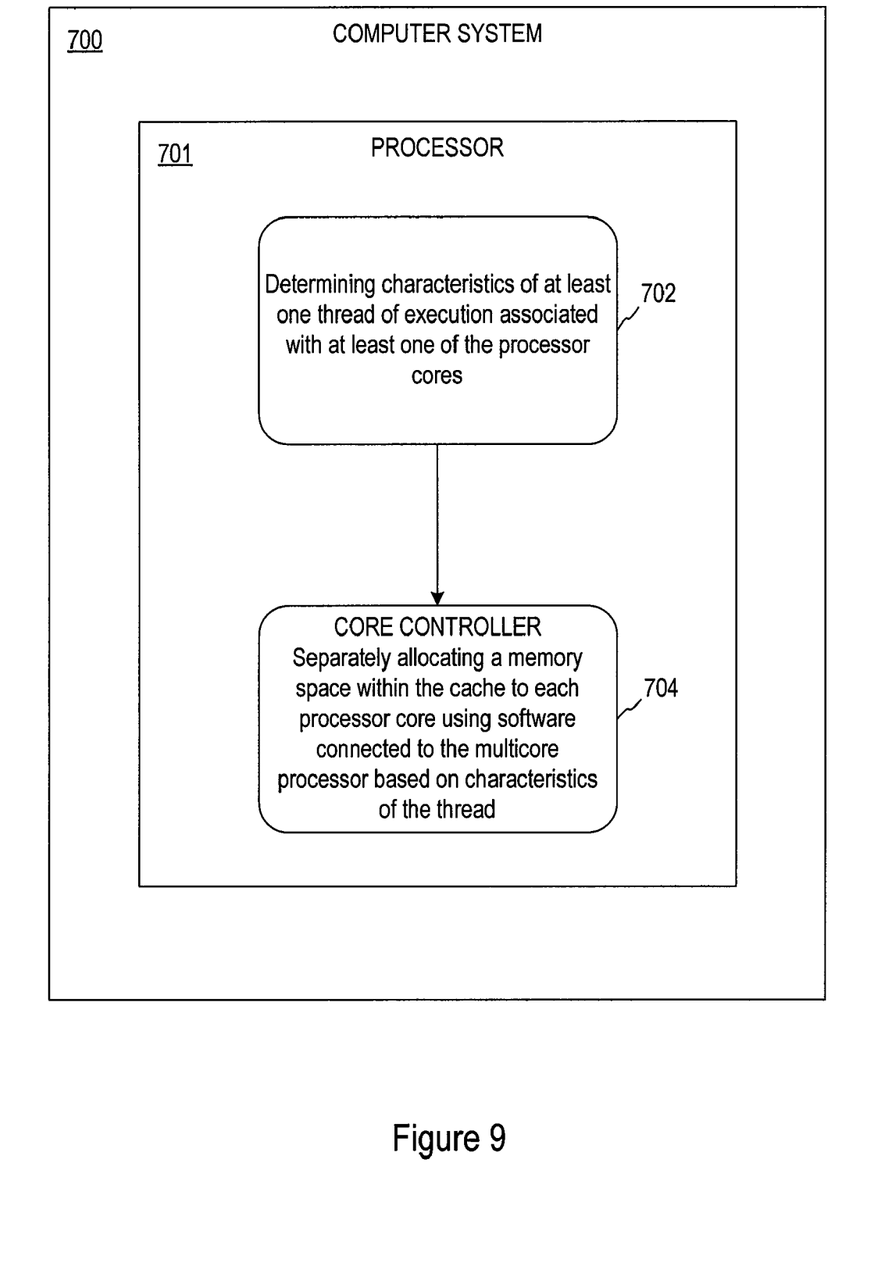
FIG. 9 is a block diagram illustrating a system and process for cache allocation.

FIG. 9 is a block diagram illustrating a system and process for cache allocation in accordance with at least some examples of the present disclosure. As shown in the FIG. 9, a computer system 700 may include a processor 701 configured for performing an example of a process for partitioning a shared cache. In other examples, various operations or portions of various operations of the process may be performed outside of the processor 701. In operation 702, the process may include determining characteristics of at least one (one or more) thread of execution associated with at least one (one or more) of the processor cores 210-204. In operation 704, the process may include the core controller 116 (FIG. 1) separately allocating a memory space within the cache memory 300 to the individual processor cores 201-204 using software coupled to the multi-core processor, based at least in part on the characteristics of the thread.

Figure 10:
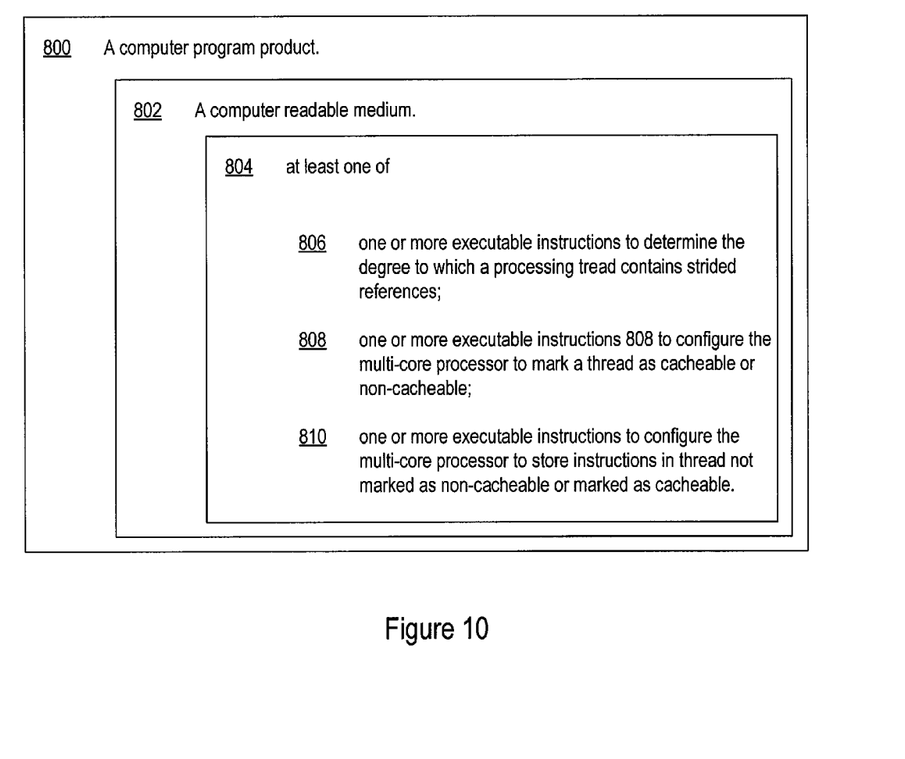
FIG. 10 shows an example of any computer readable medium that stores instructions to configure a multi-core processor to make processing threads as cacheable or non-cacheable; all arranged in accordance with at least some examples of the present disclosure.

FIG. 10 shows an example of any computer readable medium 802 that is arranged to store instructions to configure a multi-core processor to make processing threads as cacheable or non-cacheable in accordance with at least some examples of the present disclosure. The computer readable medium 802 may be part of a computer program product 800, such as an operating system, a compiler, or an application. The computer readable medium 802 may be adapted to store instructions 804 that may be arranged to configure the multi-core processor to perform one or more of the processes or methods previously described. These instructions 804 may include, for example, one or more executable instructions 806 to determine the degree to which a processing thread contains strided references. The executable instructions 804 stored in the computer readable medium 802 may also include an executable instruction 808 to configure the multi-core processor to mark a thread as cacheable or non-cacheable based on the determination of whether the processing thread contains strided references. Another executable instruction 810 stored in the computer readable medium 802 may be arranged to configure the multi-core processor to store instructions in the thread that have not been marked as non-cacheable or that have been marked as cacheable in the cache memory.

The foregoing describes various examples of processor core-based cache allocation. Following are specific examples of methods and systems of processor based cache allocation. These are for illustration only and are not intended to be limiting.

Disclosed in a first example is a computing system comprising a multi-core processor, at least one cache memory that is accessible to at least two of the processor cores, and a cache controller coupled to the multi-core processor for separately allocating cache memory associativity to individual processor cores accessing the cache memory. In some further examples, the cache memory associativity may be allocated to the processor cores based at least in part on hardware characteristics of the processor cores. In other examples, the cache memory associativity may be allocated to the processor cores based at least in part on the execution characteristics of one or more threads of execution associated with the processor cores. In some further examples, allocation of the cache memory associativity may be accomplished dynamically so that it may change with time. In these and other examples, cache memory associativity may be separately determined for different rows of the cache memory. In still other examples, the system or software includes one or more components, such as branch predictors, configured for identifying strided references in a processing thread, and for marking the thread with a non-cacheable flag such that the instructions of the thread are not stored within the cache memory.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

We claim:

1. A computing system, comprising:
a multi-core processor comprising a plurality of individual processor cores;
a cache memory that is configured to be accessible to at least some of the plurality of the individual processor cores; and
a cache controller coupled to the multi-core processor, the cache controller configured to allocate a memory space within the cache memory, the cache controller further being configured to facilitate access to the cache memory by at least some of the plurality of the individual processor cores with respective levels of associativity that are different for at least some of the plurality of the individual processor cores.

2. The computing system of claim 1, further comprising a core controller coupled to the plurality of individual processor cores, the core controller being configured to determine which processing tasks are to be processed by each of the plurality of individual processor cores.

3. The computing system of claim 1, further comprising a core controller coupled to the plurality of individual processor cores, the core controller being configured to determine which threads are to be stored in the cache memory.

4. The computing system of claim 1 wherein at least some of the individual processor cores comprise respective branch predictors configured to identify strided references, and wherein the computing system further comprises a core controller coupled to at least some of the plurality of individual processor cores that are configured to access the cache memory, the core controller being configured to allocate memory space within the cache memory based at least in part on the identification of the strided references.

5. The computing system of claim 1 wherein the computing system further comprises a core controller coupled to the plurality of individual processor cores, the core controller being configured to allocate memory space within the cache memory to the individual processor cores based at least in part on hardware characteristics associated with each of the individual processor cores.

6. The computing system of claim 1 wherein the cache controller is configured to assign to each of the individual processor cores that can access the cache memory a respective level of associativity for each of the rows of the cache memory.

7. The computing system of claim 1 wherein each of the individual processor cores that is configured to access the cache memory is configured to output an address comprising a plurality of middle order address bits, and wherein the cache controller is configured to use the middle order address bits as an index to select a respective row of memory cells in the cache memory.

8. The computing system of claim 1 wherein each of the individual processor cores that is configured to access the cache memory is configured to output an address comprising a plurality of high order address bits, and wherein the cache controller is configured to use the high order address bits as respective tags that are stored in the cache memory by comparing the high order address bits of an address from one of the individual processor cores to each of the stored tags, the cache controller being configured to be responsive to a match between the high order address bits of an address and one of the stored tags to cause the one of the individual processor cores individual processor core to access data stored at a location in the cache memory corresponding to the location at which the tag is stored.

9. The computing system of claim 1 wherein each of the individual processor cores that is configured to access the cache memory is configured to output an address comprising a plurality of low order address bits, and wherein the cache controller is configured to use the low order address bits to select a plurality of bits of data stored in the row of the cache memory.

10. The computing system of claim 1 wherein each column of the cache memory is configured to store a bit vector, and wherein the cache controller is configured to use the bit vector to determine which of the individual processor cores may access the respective column of the cache memory.

11. The computing system of claim 1 wherein the cache controller is configured to cause instructions and data to be written to the cache memory using a write-back cache write policy.

12. The computing system of claim 1 wherein the cache controller is configured to allow the cache memory to be accessed by each of the individual processor cores that is configured to access the cache memory with a respective level of associativity based at least in part on hardware characteristics associated with each of the individual processor cores.

13. The computing system of claim 1 wherein the cache controller is configured to allow the cache memory to be accessed by at least some of the plurality of individual processor cores with a respective level of associativity based at least in part on an execution characteristic of threads of execution associated with the at least some of the plurality of individual processor cores.

14. A method for allowing a plurality of processor cores to access a cache memory, the method comprising:
assigning a respective level of cache memory associativity to each of the plurality of processor cores, the level of cache memory associativity assigned to at least one of the plurality of processor cores being different from the level of cache memory associativity assigned to a least another one of the plurality of processor cores; and
facilitating each of the plurality of processor cores to access the cache memory with the respective assigned level of associativity.

15. The method of claim 14, further comprising evicting data stored in the cache memory using a least recently used replacement policy.

16. The method of claim 14 wherein assigning a respective level of associativity to each of the plurality of processor cores comprises assigning to each of the plurality of processor cores that can access the cache memory a respective level of associativity for each of the rows of cache memory, the level of associativity assigned to some of the rows being different from the level of associativity assigned to other of the rows.

17. The method of claim 14, further comprising:
identifying threads that contain more than a specific quantity of non-looped instructions;
marking the identified threads with a non-cacheable flag; and
inhibiting the marked threads from being stored in the cache memory.

18. The method of claim 14 wherein assigning a respective level of associativity to each of the plurality of processor cores comprises dynamically assigning a level of associativity to each of the plurality of processor cores such that the assigned level of associatively varies with time.

19. A non-transitory computer accessible medium having stored thereon computer executable instructions for performing a procedure for allowing a plurality of processor cores to access a cache memory in a computing system, the procedure comprising:
assigning a respective level of cache memory associativity to each of the plurality of processor cores, the level of cache memory associativity assigned to at least one of the plurality of processor cores being different from the level of cache memory associativity assigned to a least another one of the plurality of processor cores; and
allowing each of the plurality of processor cores to access the cache memory with the respective assigned level of associativity.

20. The computer accessible medium of claim 19, wherein assigning a respective level of cache memory associativity to each of the plurality of processor cores comprises associating each of the plurality of processor cores with specific columns in each of a plurality of rows of the cache memory.

* * * * *

UNITED STATES PATENT AND TRADEMARK OFFICE
CERTIFICATE OF CORRECTION

PATENT NO. : 8,244,982 B2
APPLICATION NO. : 12/545625
DATED : August 14, 2012
INVENTOR(S) : Wolfe et al.

Page 1 of 1

It is certified that error appears in the above-identified patent and that said Letters Patent is hereby corrected as shown below:

In Fig. 10, Sheet 6 of 6, for Tag "806", in Line 2, delete "tread" and insert -- thread --, therefor.

In Column 2, Line 61, delete "my" and insert -- may --, therefor.

In Column 3, Line 2, delete "prefetech" and insert -- prefetch --, therefor.

In Column 3, Line 22, delete "conating" and insert -- containing --, therefor.

In Column 6, Line 20, delete "AM" and insert -- $A_M$ --, therefor.

In Column 8, Line 13, delete "prefeteched" and insert -- prefetched --, therefor.

In Column 8, Line 35, delete "non-cachable" and insert -- non-cacheable --, therefor.

In Column 9, Line 40, delete "can may" and insert -- may --, therefor.

In Column 13, Line 31, in Claim 8, delete "cores individual processor core to" and insert -- cores to --, therefor.

In Column 14, Line 11, in Claim 14, delete "to a least" and insert -- to at least --, therefor.

In Column 14, Line 38, in Claim 18, delete "associatively" and insert -- associativity --, therefor.

In Column 14, Line 48, in Claim 19, delete "to a least" and insert -- to at least --, therefor.

Signed and Sealed this
Eighth Day of January, 2013

David J. Kappos
*Director of the United States Patent and Trademark Office*